Dec. 10, 1968
A. REINCKE
3,415,101
WELDLESS METAL BONDING DEVICE
Filed Oct. 11, 1965
6 Sheets-Sheet 1
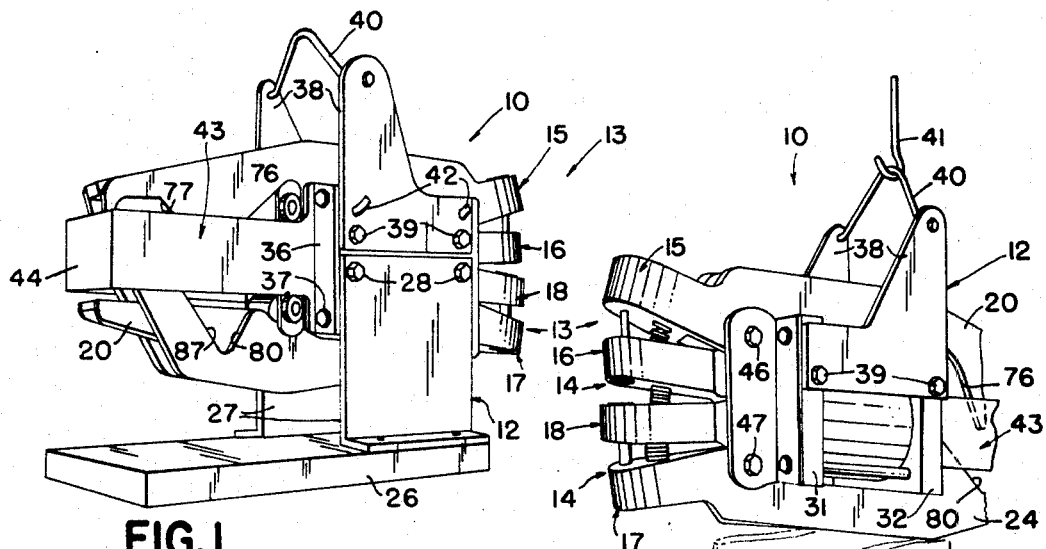
FIG. 1
FIG. 2
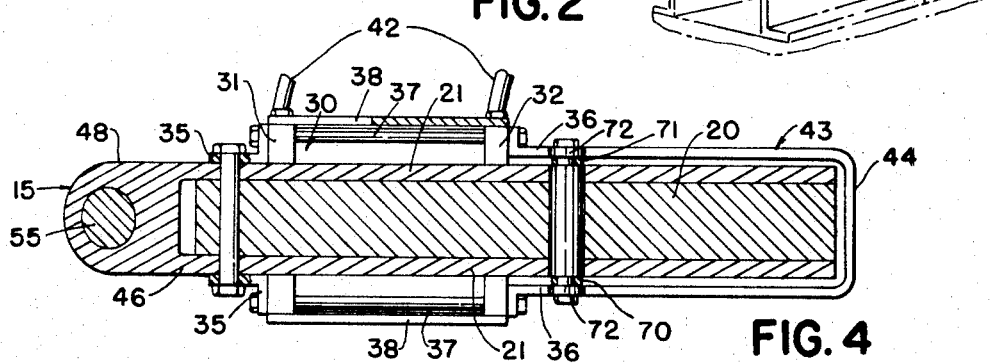
FIG. 4
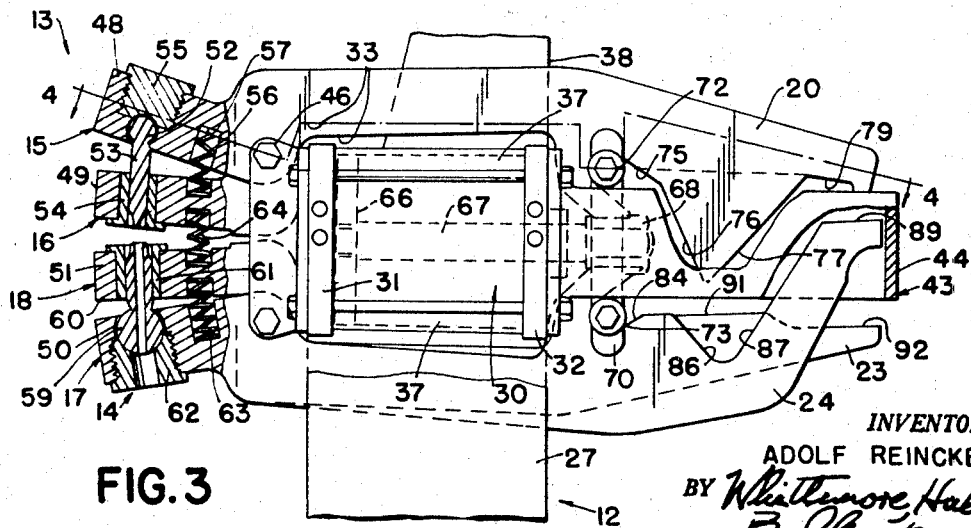
FIG. 3
INVENTOR.
ADOLF REINCKE
BY Whittemore, Hulbert
Belknap
ATTORNEYS

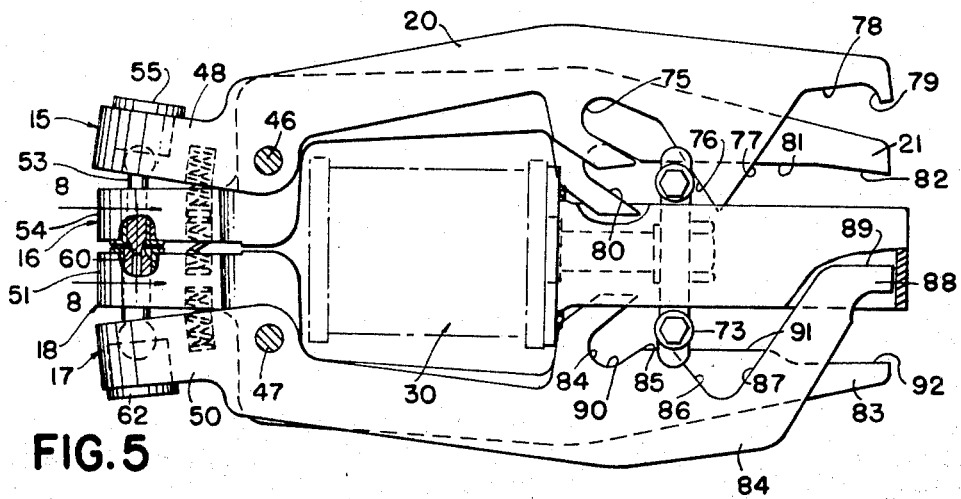
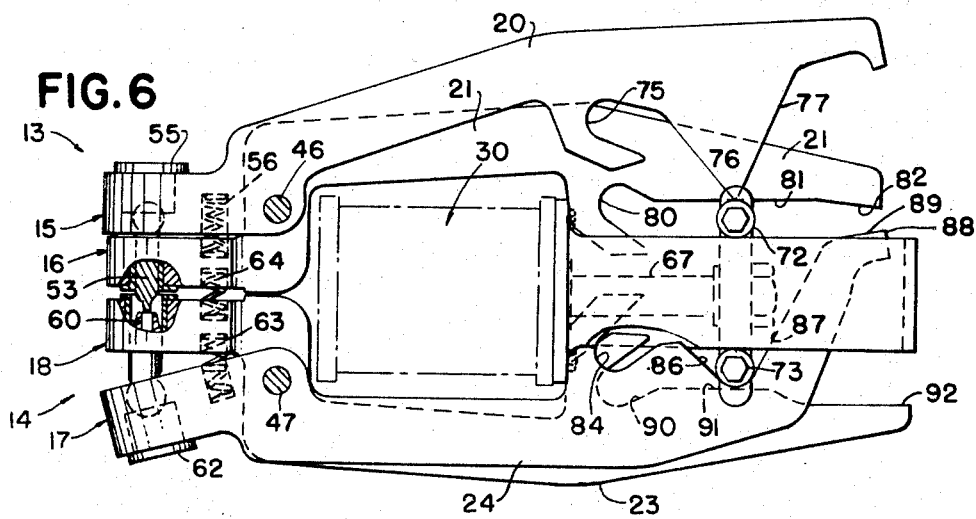
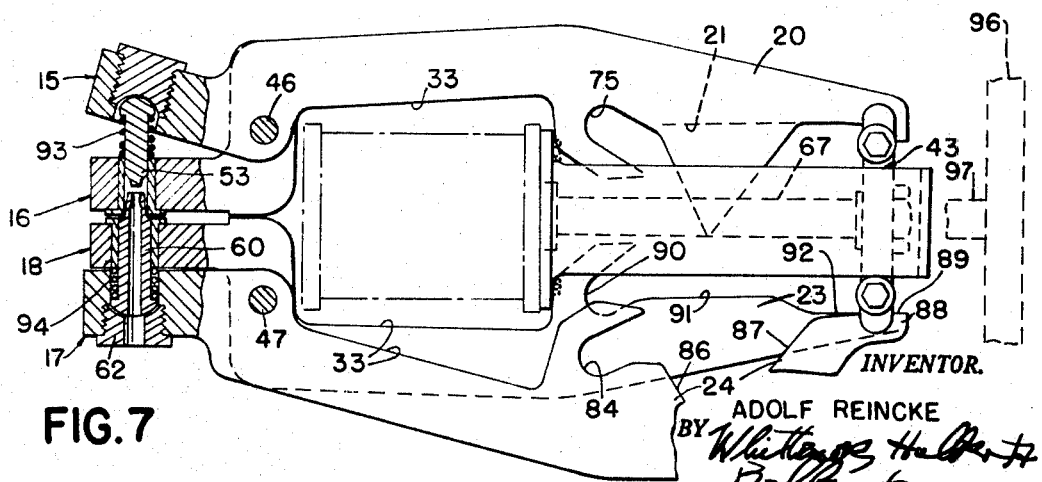

Dec. 10, 1968 A. REINCKE 3,415,101
WELDLESS METAL BONDING DEVICE
Filed Oct. 11, 1965 6 Sheets-Sheet 3
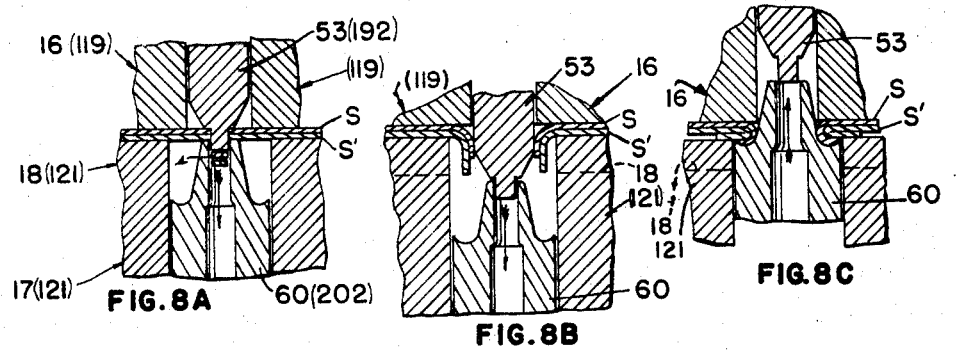
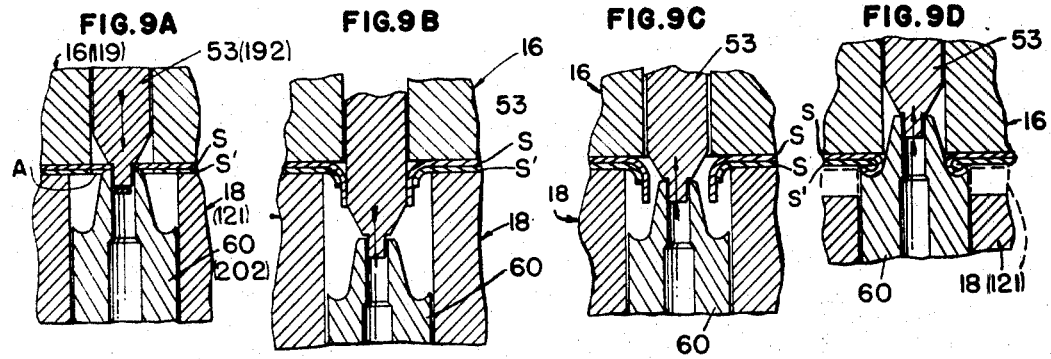
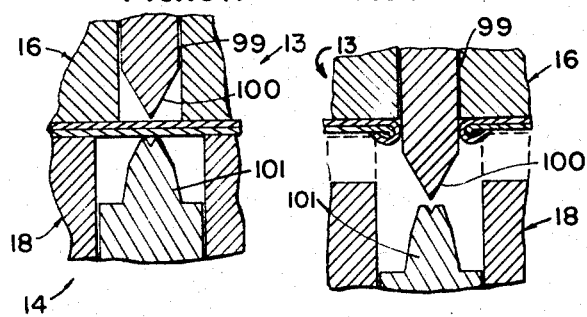
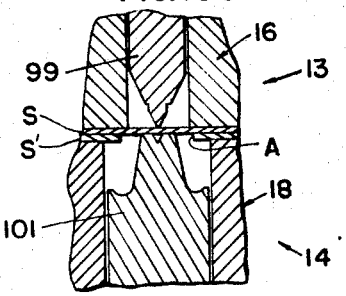
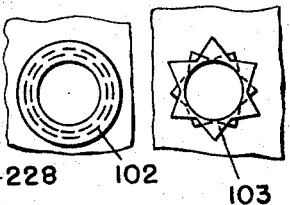
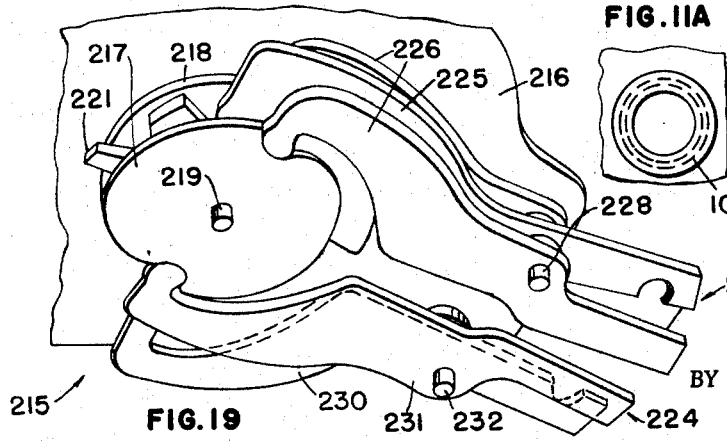
INVENTOR.
ADOLF REINCKE
BY Whittemore Hulbert
Belknap
ATTORNEYS Dec. 10, 1968  A. REINCKE  3,415,101
WELDLESS METAL BONDING DEVICE
Filed Oct. 11, 1965  6 Sheets-Sheet 5
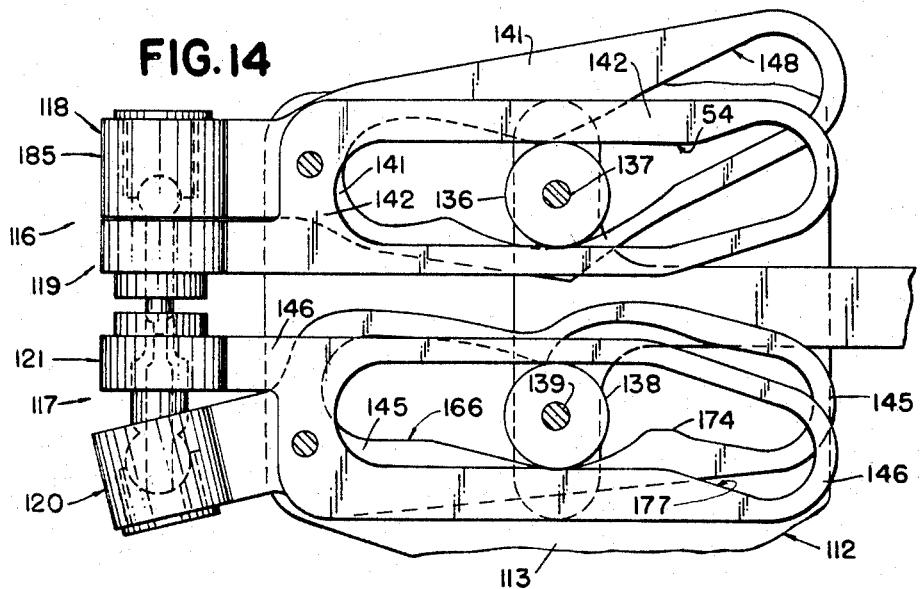
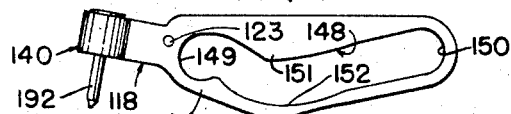
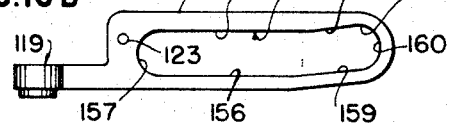
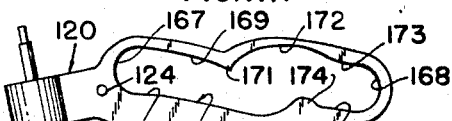
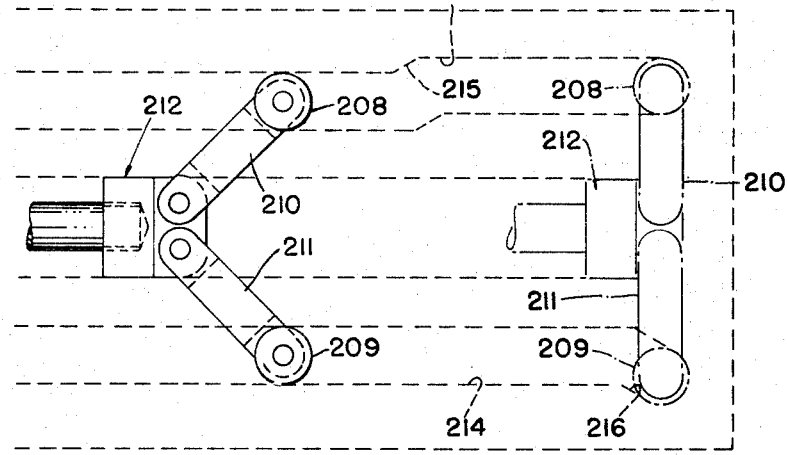
INVENTOR.
ADOLF REINCKE
BY Whittemore, Hulbert
Belknap
ATTORNEYS

INVENTOR.
ADOLF REINCKE

United States Patent Office 3,415,101
Patented Dec. 10, 1968

3,415,101
WELDLESS METAL BONDING DEVICE
Adolf Reincke, 23335 Clairwood,
St. Clair Shores, Mich. 48080
Filed Oct. 11, 1965, Ser. No. 494,754
23 Claims. (Cl. 72—333)

ABSTRACT OF THE DISCLOSURE

There are disclosed an improved method, and a number of embodiments of a device for carrying out this method, for the weld-free, rivet-free and grommet-free bonding of metal sheets flatwise against one another. This bond is accompanied by an initial penetration of the superposed sheets in one way or another, accompanied by an extrusion of the penetrated material out of the plane of the sheets, as clamped by the device, then a final upsetting or crimping of the material outwardly onto one of the sheet surfaces to complete the union. The device may be a manually operated one, either portable or mounted on a permanent base; it may also be automatically operated in various ways, i.e., under hydraulic or pneumatic power, by cam and follower provisions of various sorts, slidable or rotatable, etc.

The device comprises a pair of jaw sets, each including an inner material clamping jaw and an outer material forming jaw, the jaws of these sets being hereinafter designated male and female. The operation of the device involves conjoint relative movements of the two sets, each considered as a whole, relative to one another, accompanied by relative movements of the component male and female jaws relative to one another.

In a single cycle of operation of the device, the male and female jaw pairs first clamp the sheets to be joined between apertured inner male and female jaws, with a punching or penetrating tool on the outer male jaw telescoping within the aperture of the inner male jaw to effect the desired penetration of the sheet material. This is accompanied by the extrusion of the material out of the plane of the sheets, as indicated above.

As the male tool penetrates the clamped material, it takes mating engagement with a female or die tool carried on the outer female jaw and telescoped within the aperture of the latter; and as the penetration and extrusion proceed the female tool retracts within its aperture. In a following phase, however, the female tool reverses its direction and, with at least one of the inner jaw members separated from the sheets, the female tool engages the extruded material to upset it flaringly outwardly, in the lateral sense, into a clearance space which is made available by the separation of the male and female inner jaw members. Thus a wide radial outward overlap of the extruded material onto a surface of the sheets is effected; and a strong bond is the result.

The present invention relates to an improved method and device for the bonding or joining of metal sheets in flatwise engagement with one another. More particularly, the invention relates to an improvement in which the method is performed using a device capable of being embodied in portable, manually operated form, or in a fixedly mounted structure adapted to be manually or power operated.

It is an object of the invention to provide a device for the purpose referred to which bonds the sheets together without recourse to spot welding, or to the use of separate grommet or rivet means. In accordance with the invention, the bonding is accomplished solely by successive punching, piercing or lancing, extruding, and upsetting or clinching operations performed on the sheets, thus to effect a strong and permanent union thereof through their own sole agency.

A further object of the invention is to provide a sheet bonding device or mechanism of this type which comprises a pair of coacting outer and inner, cammed male clamping, punching, extruding and upsetting jaws, a pair of coacting outer and inner cammed female jaws, all mounted within an appropriate housing structure for relative pivotal motion of the jaws in the bonding operation, and an actuator movable within said structure and provided with cam operating means for the timed pivoting of the cammed jaws relative to one another in predetermined sequence.

Further in accordance with the invention, the outer and inner jaws of both the male and female jaw sets are moved relative to and independently of one another, in response to movement of the actuator, in sequentially effecting the piercing of one or more sheets being bonded, the extrusion of the area of the pierced sheet or sheets out of the plane of the latter, and the final 90° bending upsetting of such sheet or sheets into the desired clinched and bonded condition.

Yet another object of the invention is to provide such a device, portably or fixedly mounted and manually or power operated, as mentioned above, in which the piercing operation may be one in which a separate slug or slug pair is punched from one or more sheets, or in which the piercing operation may be simply a penetration of the sheet or sheets without removal of metal.

A still further object is to provide a bonding device or mechanism as described, in which the actuator within the housing structure which cammingly operates the outer and inner male and female jaw sets may be either linearly movable or translatable, or may be rotative in its action. Likewise, the actuator may be automatically or power-operated, as by suitable fluid pressure or mechanical means, or may be manually operated, and, in any of these instances either from a fixed mount or a portable one.

In accordance with certain embodiments of the invention, the jaw sets have arcuate swinging motion relative to one another and the sheets being bonded during the bonding operation. In another, and possibly preferred adaptation, the motion is strictly rectilinear and reciprocatory along a common axis, this embodiment permitting the design of a device having a relatively large throat dimension to receive the sheets. Cam power actuation is preferably employed, coupled with toggle or like means for amplifying the thrust of the jaws at the final upsetting or clinching phase of the bonding cycle.

Furthermore, the invention contemplates actuating means of the above sorts which are capable of exerting the various operations of the method through agencies setting up substantial advantages to assist the force applying phases of the bonding procedure, thus making the device particularly suitable for manual operation, as well as for embodiment in small and large sized power models.

In general it is an object of the invention to provide a device to perform a permanent bonding operation on sheets, involving independent action relative to one another of outer and inner jaws of the male and female jaw sets, in which the bonding is accomplished in a single reciprocal or rotative cycle of the jaw actuator, and in which the provisions to attain these ends are extremely simple and inexpensive in nature.

It is to be understood that, while typical embodiments, operating under the basic principle mentioned in the preceding paragraph, are herein schematically illustrated and described, many other alternatievs exist, and will be briefly referred to in the specification to follow. It is also to be understood that structural components of the device are illustrated in a rather elemental manner, and possibly do not represent ultimate refinements which may well be incorporated in an industrial tool.

The foregoing as well as other objects will become more apparent as this description proceeds, especially when considered in connection with the accompanying drawings illustrating the invention, wherein:

FIG. 1 is a perspective view showing an embodiment of the invention in a fluid pressure power adaptation, as mounted on a fixed bench or like support, the view being from the rear of the unit;

FIG. 2 is a similar perspective view, but from the front of the device; illustrating its use in a portable manner separated from the fixed mount of FIG. 1, which is shown in dot-dash line in FIG. 2;

FIG. 3 is a fragmentary side elevational view, partially broken away and in vertical front-to-rear section, of the fluid pressure-operated unit, the latter being shown in an initial open and starting position of its male and female jaw sets;

FIG. 4 is a horizontal section on broken line 4—4 of FIG. 3;

FIG. 5 is a view similar to FIG. 3, but with the jaw sets in a piercing, punching or lancing relationship to one another;

FIG. 6 is a similar view, the jaw sets being shown in a next, extruding relationship;

FIG. 7 is a further view generally similar to FIGS. 3, 5 and 6, the jaw sets being illustrated in their final clinching, upsetting or riveting position, this view also incidentally showing a slight modification in the jaw biasing spring means of the bonding device, as well as (in dot-dash line to the right), a suggested provision for manually or otherwise mechanically operating the jaw sets;

Figure 12:
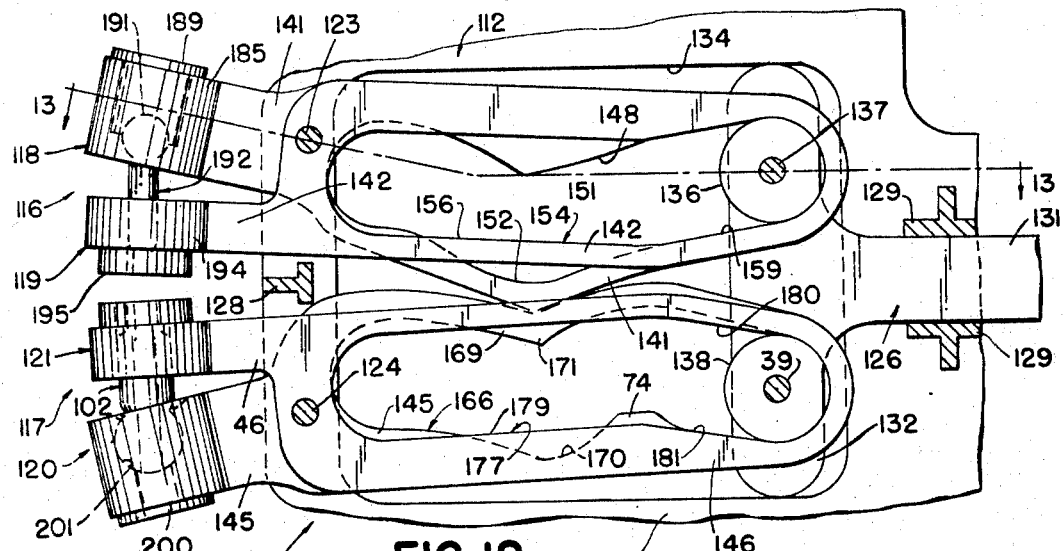
Figure 13:
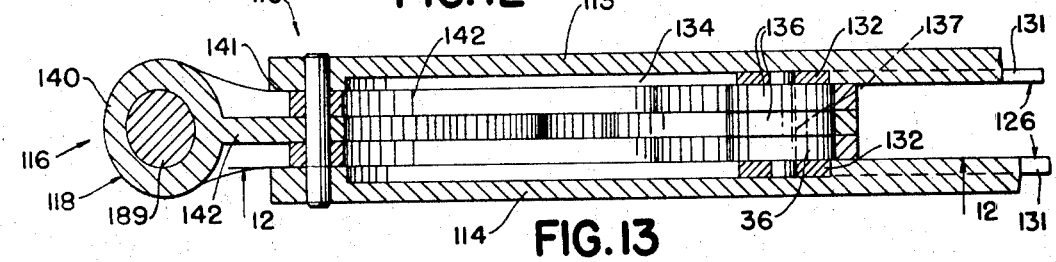
Figure 15:
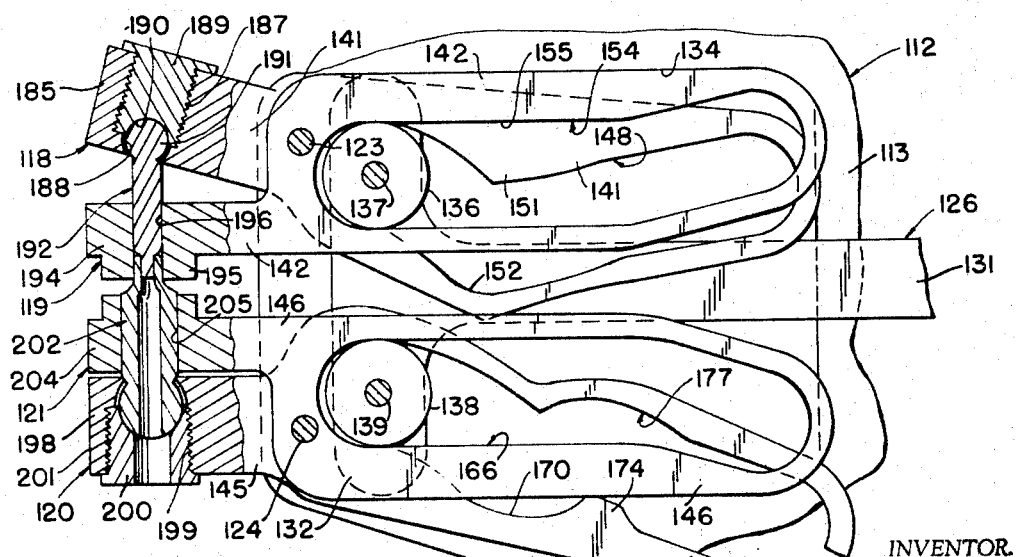
Figure 20:
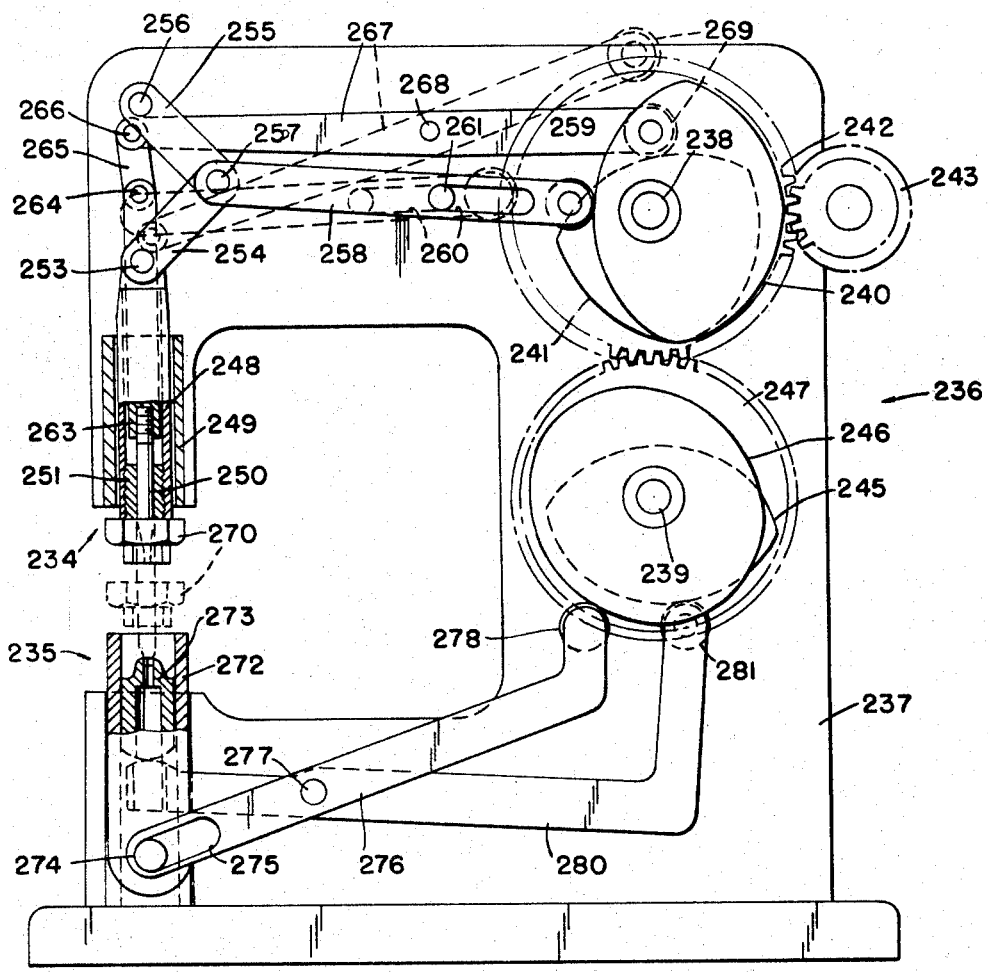

FIGS. 8A, 8B and 8C are fragmentary and schematic, bracketed views in larger scale and in section on a line corresponding to line 8—8 of FIG. 5, illustrating the sequence of operations performed on the metal sheets, corresponding to the position of the jaw parts appearing in FIGS. 5, 6 and 7, and in which at least two sheets are punched, extruded and clinched or riveted together, a withdrawn position of a lower clamping jaw member being shown in dotted line;

FIGS. 9A and 9B are fragmentary sectional views similar to FIGS. 8A and 8B, respectively, but depicting an operation in which but one of the sheets is punched;

FIGS. 10A and 10B are fragmentary views in section similar respectively to FIGS. 8A and 8B, showing an embodiment of the invention in which two or more of the sheets are lanced or pierced without removal of metal, FIG. 10B illustrating in dotted line the ultimate position of the upset and crimped portion of the material;

FIG. 10C illustrates a generally similar procedure in which one or more but not all of the sheets is lanced;

FIGS. 11A, 11B and 11C are fragmentary plan views illustrating only three of the various types of weldless sheet bond which can be made by the device of the invention;

FIG. 12 is a fragmentary side elevational view of a modified, manually or mechanically operated embodiment of the device of the invention, with a near side of its housing omitted for clarity, this view, like FIG. 3, showing the device in a fully retracted and spread condition of its respective male and female jaw sets at the outset of a bonding operation, as well as the spread relation of the jaws of those sets relative to one another, the illustrated device furthermore being an embodiment operated by a longitudinally movable actuator;

FIG. 13 is a view in generally horizontal section along line 13—13 of FIG. 12;

FIG. 14 is a fragmentary view similar to FIG. 12, but showing the jaws of the male and female sets of this embodiment in an intermediate position following the punching and extrusion of one or more of the sheets to be bonded;

FIG. 15 is a further view similar to FIGS. 12 and 14, but partially broken away and in section through the jaw components, showing the jaws in a final position after they have finally upset and clinchingly bonded the material of the sheets, after which the cycle depicted in FIGS. 12, 14 and 15 is reversed to free the bonded sheets from the device;

FIGS. 16A and 16B are, respectively, schematic side elevational views showing the individual outer and inner male jaws making up one of the jaw sets of the device of FIGS. 12–15;

FIGS. 17A and 17B similarly illustrate, respectively, the outer and inner female jaws of the other set;

FIG. 18 is a schematic view illustrating in solid and dotted line certain provisions which may be made in the above embodiments for building into the device a substantial mechanical advantage to assist the various operations performed, in particular the final clinching step;

FIG. 19 is a schematic fragmentary perspective view included for the sole purpose of suggesting a bonding unit in which the jaw set actuator is powered rotatively or oscillatingly, rather than in bodily longitudinal motion, as in the embodiments previously described; and FIG. 20 is a schematic view in side elevation illustrating a still further modified embodiment of the device which is shown as being cam-power operated, and in which the jaw sets have a strictly rectilinear reciprocating action, rather than a swing as in the earlier forms.

Referring first to FIGS. 1 and 2 of the drawings, there is shown therein an embodiment 10 of the bonding device which is automatically operated, as by pneumatic or hydraulic pressure. Generally considered, this device comprises an improved type of frame structure 12 which permits the use of the unit on a fixed support (FIG. 1) or in a portable way (FIG. 2), in a manner to be described. Device 10 comprises a pair of outer and inner male and female jaw sets 13 and 14, the set 13 including an outer male jaw 15 and an inner male jaw 16 and the set 14 including an outer female jaw 17 and an inner female jaw 18.

While, as will appear, the terms "inner" and "outer" may be considered in the sense that the former in each case, male and female, lie laterally between or intermediate the latter or outer, nevertheless in the special context of the present description the terms "inner" and "outer" are to be considered as describing the jaw's positional relationship appearing in FIGS. 1, 2, 3, 5, 6 and 7, i.e., the outer male jaw 15 is disposed upwardly and outwardly of the inner male jaw 16; and the outer female jaw 17 is disposed downwardly and outwardly of the inner female jaw 18.

As best shown in FIGS. 3–6, the outer male jaw 15 is formed to provide a rearwardly extending, integral cam-providing extension 20, which is located between like parallel and laterally spaced cam-providing extensions 21 of the outer male jaws 15, each of such extensions integrally joining the jaw proper at the forward end of the latter. Similarly, the inner female jaw 18 has an integral rear cam extension 23 which is located between like integral cam extensions 24 of the outer female jaw 17. Male jaw extensions 21 have identical cam formations adjacent the rear thereof; and the corresponding outer female jaw extensions 24 likewise have identical cam formations thereon, but differing from those of the outer male jaw extensions 21. These cam outlines will be hereinafter described in detail.

With suitable simple changes, the outer male jaw 15 and the outer female jaw 17 may be formed to have integral, one-piece rear extensions 20, 24, respectively rather than the dual part construction actually shown.

The frame structure 12 (in a fixed mount adaptation thereof, per FIG. 1) may comprise a suitable bench or otherwise supported base 26 having parallel, upright side housing panels or plates 27 secured thereto in laterally spaced relation to one another; and bolts or screws 28 taking through these panels adjacent the upper margin thereof are suitably connected to opposite ends of a fluid pressure actuator 30, these fastening elements engaging the actuator 30 at opposite front and rear cylinder heads 31, 32, respectively. The actuator 30 may be hydraulically or pneumatically powered, and is shown as being a double acting air cylinder although a single acting unit employing spring force for its return stroke may be used.

The several jaw extensions described above are recessed at 33 to accommodate the cylinder 30 between the jaws proper, to the left, and cam formations, to the right (to be described); and pairs of laterally spaced angle bracket plates 35, 36 are secured to the respective cylinder heads 31 and 32, projecting forwardly and rearwardly of the latter. The securement may be accomplished by elongated through bolts 37 at opposite sides of the operating cylinder 30.

The frame structure 12 is completed by a pair of parallel laterally spaced hanger plates 38 directly above the respective upright side plates or panels 27. Bolts or screws 39 are employed to fixedly secure the plates 38 to the respective cylinder heads 31 and 32; and these plates are provided adjacent the top thereof with a suitable suspending bail 40. Thus, as indicated in FIG. 2, the bonding device 10 may be released from its upright base plates 27 by removing the bolts 28, whereupon unit 10 may be separated from the base part of the supporting structure 12, manually or by an overhead hook 41 or the like permitting the unit to be transported from place to place.

Fluid pressure connections are made to the respective front and rear cylinder heads by flexible hoses 42, as shown only in FIGS. 1 and 4, and suitable control valve means (not shown) will of course be provided.

The rear bracket means 36 (FIG. 1) is integrally formed to provide a rearwardly extending guide frame 43 of substantial length and rectangular, box-like frame outline, completed at its rear end by an integral cross wall 44. This frame provides, at its parallel upper and lower edges, way surfaces along which certain cam operating roller means (to be described) may be guided for straight-line, reciprocatory motion, although the air cylinder 30 inherently has a true stroke.

At the opposite, forward end of fluid pressure cylinder 30, the brackets 35 mount a pair of upper and lower pivot bolts or pins 46, 47, respectively. The upper pin 46 (FIGS. 2 through 7) extends through and form a common pivot for the outer and inner male jaws 15, 16, respectively, just forwardly of the recesses 33 in the latter; while the lower bolt or pin 47 affords a similarly located common pivot for the outer and inner female jaws 17, 18, respectively. Thus it is seen that the supporting structure 12, whether employed in a fixed or a portable mount installation, per FIGS. 1 and 2, respectively, provides a mount for the air or hydraulic cylinder 30, as well as pivoting and cam guide provisions for the respective sets of male and female jaws 13, 14.

As best illustrated in FIG. 3 of the drawings, the outer male jaw 15 has an integral forward jaw head 48; and the inner male jaw 16 has an integral forward jaw head 49. Similarly, the outer female jaw 17 has an integral forward jaw head 50; and the inner female jaw 18 has an integral jaw head 51.

Male jaw head 48 is formed to provide a quasi-spherical punch-receiving seat for the reception of the spherical head 52 of a male punch 53, which slides in the bore of a flanged guide bushing 54 of inner male jaw head 49. The punch 53 is held in place by a plug 55 threaded in the top of outer male jaw head 48; and a coil compression spring 56 received at its ends in opposing seats 57 of the heads 48, 49, intermediate punch 53 and the jaw pivot at 46, serves to urge male jaws 15 and 16 away from one another at the respective heads thereof.

As also best shown in FIG. 3, the outer female jaw head 50 has a quasi-spherical seat receiving the spherical head 59 of a hollow female punch or die element 60. The shank of this element slides in a guide sleeve 61 of inner female jaw head 51, the die element 60 being restrained by a threaded tubular plug 62 which will receive punched out slugs; and a coil spring 63 urges the outer and inner female jaw heads 50, 51 in opposite directions away from one another. In addition, the male and female jaw sets 13, 14, respectively, are biased in opposite directions at the head ends thereof by a third coil compression spring 64. This completes the head end arrangements of jaws 48, 49, 50 and 51.

As shown in FIG. 3, the quasi-spherical seats which socket the tools 53 and 60 afford side clearance which permits free swing and rectilinear action of the latter as the jaws come together; and it will be seen that the use of threaded plugs 55, 62, each also having a quasi-cylindrical tool engaging seat, on the respective outer male and female heads 15, 17 facilitates replacement of the punch and die elements 53, 60. The tool sockets provide a universal swivel for tools of circular cross section; however, this joint may be semi-cylindrical in certain cases.

As illustrated in FIG. 3, the pneumatic cylinder 30 includes the usual internal piston member 66 connected to a plunger rod 67 which extends rearwardly through the rear cylinder head 32, being appropriately guided axially and sealed at this point. Outwardly of the head 32, the plunger 67 is fixedly connected, as by appropriate bolt and back-up washer means 68, to the midpoint of a pair of parallel, laterally spaced and vertically upright links 70, 71, each of which has adjacent the top and bottom thereof, pairs of axially aligned guide rollers 72, 73. The roller pairs 72 and 73 lie just outward laterally of the respective links 70, 71, and travel the top and bottom edges of the rearward guide frame 43 described above. Thus, as operated by air cylinder 30, the links 70, 71 and rollers 72, 73 are accurately guided for true horizontal reciprocation over a substantial distance.

As illustrated in FIGS. 3–7, the outer, rearwardly extending male jaw extensions 21 are formed to provide, rearwardly of air cylinder 30, a forwardly and upwardly inclined notch 75 of a width to receive the upper guide rollers 72 and, to the rear of this notch, to provide a triangular, downwardly facing formation defined by front and rear cam surfaces 76, 77, respectively, the latter of which merges through a flatland 78 with a rear stop formation 79.

The inner rearwardly projecting male jaw extension 20 is also formed with a notch 80 similar to the notch 75, the extension 20 proceeding rearwardly along a flat edge 81 to a mildly downwardly cammed tail edge 82.

The outer female jaw extensions 24 are each formed to provide a forwardly and downwardly inclined notch 84, generally corresponding to the notches 75, and correspondingly receiving the lower set of guide rollers 73. To the rear of the notches 84, the extensions 20 have parallel horizontal flats 85, then V-recesses defined by opposed, convergent walls 86, 87, the latter of which terminates in a rearwardly directed tongue 88 having a flat upper surface 89.

The inner female jaw extension 23 is provided with a notch 90, between the notches 84 of extensions 24, from which notch 90 a mildly rearwardly inclined surface 91, and the latter is downwardly relieved at its tail end portion 92, for a purpose to be described.

As illustrated in FIG. 7 of the drawings, the device 10 differs a bit from the showing of FIGS. 1 through 6, but solely in the fact that a pair of coil springs 93, 94 interposed between the outer and inner male jaw heads 15, 16 and the outer and inner female jaw heads 17, 18, respectively, serve to bias these respective pairs, rather than the three element spring set of FIGS. 1 through 5. Similarly, FIG. 7 suggests, in dot-dash line at the right, the possible use of a manual actuator 96 having an operating rod 97 adapted to be connected directly to the links 70, 71, in substitution for fluid pressure actuation, or to be connected to the plunger 67 as a supplemental means for operating the unit 10.

In operation, considerating FIGS. 3–7 in conjunction with FIGS. 8A, 8B and 8C and FIGS. 9A–9D, a bonding cycle commences with the unit 10 in the position of its parts illustrated in FIG. 3, i.e., with the jaws 15, 16 of the male set fully spread from one another, the jaws 17, 18 of the female set similarly spread, and the two sets 13, 14 also at maximum separation. In this position the upper rollers 72 on links 70, 71 lie in their forwardmost position in the notches 75, 80 of the outer and inner male jaw extensions 20, 21, respectively; and the lower rollers 73 on the links correspondingly lie at the forward ends of the notches 84 and 90 of the outer and inner female jaw extensions 24, 23, respectively.

As the roller sets are forced to the rear (right in FIGS. 3 through 7), the rollers 72, after leaving the notch 75, engage the cam surface or surfaces 76 of the outer male jaw extension or extensions 20 to urge the outer male jaw 15 counterclockwise about its pivot at 46; and this thrusts the male punch 53 downward in a punching or piercing stroke, as shown in FIGS. 5 and 8A, in which slugs s are removed from the sheets S, S' being bonded. Simultaneously the rollers 72 on the links also ride out of notch 80 and onto the surface 81 of inner jaw member extension 21, urging the inner male jaw 16 counterclockwise and downwardly to clamp the work.

As these motions take place, the lower side rollers 73 ride out of the notches 84 and 90, with the result that the inner female jaw 18 has a slight counterclockwise, work clamping motion upwardly about its pivot at 47; and this motion is approximately followed by the outer female jaw 17. Consequently, the outer male jaw 15 and male punch 53 and the outer female jaw 17 and female punch or die 60 are in the clamping, punching or piercing relationship to two previously imperforate sheets S, S' being punched which is illustrated in FIG. 8A.

With the work thus clamped and the punching operation completed, the lower guide rollers 73 ride down the slope at 86 of the outer female jaw extension 84, so that the outer female jaw 17 now reverses its motion to counterclockwise about pivot 47, and the male and female punch and die elements 53, 60 now travel together in this direction to extrude the punched sheets S, S', as shown in FIG. 6 and in FIG. 8B.

Next, the upper link carried rollers 72 travel past the steep rear inclined surface 77 of outer male jaw extension 20; and the lower roller set 73 travels up the correspondingly steep cam surface 87 of the outer female jaw extension 84, whereupon the outer female jaw 17 reverses its motion to counterclockwise about pivot 47, the outer male jaw 16 also reversing to clockwise action about its pivot at 46. This urges the female die element 60 upwardly (male punch 53 also traveling up) for the final clinching, riveting or setting action illustrated in FIG. 7 and in FIG. 8C.

As indicated in dotted line in FIG. 8B, the camming of the inner female jaw extension 23 at 92 is such that female jaw 18 will fall back counterclockwise a bit in the final crimping phase, permitting the die 60 clearance, as indicated in dotted line in FIG. 8, to engage sheet S' to commence and finish this action. The same effect of providing clearance is of course had by reason of the upward travel of inner male jaw 16. The edges of the punched apertures are curled and crimped 90° out into the clearance space, thus completing the bond of the sheet S or S'. The clinching action is magnified at its completion as the upper roller set 72 rides along the terminal surface 82 of inner male jaw extension 21 to exert increased clinching thrust between jaws 16 and 18.

This completes the bonding cycle, and a reverse shift of the roller sets 72, 73 unclamps the bonded sheets and restores the jaw sets 13, 14 to the initial position illustrated in FIG. 3 of the drawings. FIGS. 8A and 8C show reference numerals in parentheses as applied to the modified embodiment which is depicted in FIGS. 12 through 17B.

FIGS. 9A, 9B, 9C and 9D illustrate the use of the bonding device 10 in uniting an imperforate sheet S to another sheet S' which has been pre-punched to provide apertures A of substantial size. The operation is the same, with the apertured sheet S' properly located as to its apertures in relation to the other sheet or sheets S, as described above in connection with FIGS. 3, 5, 6, 7 and 8A–8C. FIG. 9C shows an additional intermediate phase in the cycle, in which the punch 53 and die 60, having reversed direction, are traveling to position for the final clinching action. When this position is reached, both the punched and the pre-punched sheets are crimped and clinched together, as shown in FIG. 9D.

FIG. 10A simply shows the device 10, as modified at the male jaw set 13 by the incorporation of a piercing punch or lance 99, the penetrating head 100 of which may be of any desired cross-section and is pointed for the penetration of a sheet or sheets without excising slug materials. The opposite element 101 is of solid cross section. This leaves a relatively star-shaped or ragged edge formation of the finally clinched extruded sheet; but the bond of the sheets is effective, nevertheless.

FIG. 10B illustrates in solid line the position of extruded portions of the sheets after their penetration, with the clamping jaw 18 withdrawn from its dotted line clamping position, also showing in dotted line these portions as finally upset and crimped in the clearance space between jaws 16 and 18.

FIG. 10C suggests a lancing of less than the whole number of sheets being bonded, i.e., in which at least one thereof is apertured at A. In other respects, the piercing, extruding and clinching are carried out as previously described.

FIGS. 11A, 11B and 11C show three illustrative types of bond, as viewed in bottom plan. In the first of these the bond 102 is of circular cross section, having been formed in a material-removing operation as depicted in FIGS. 8A–9D.

The next bond 103 (FIG. 11B) was produced by a lancing or piercing operation, using punch and die elements 99, 101 of circular cross section, as in FIGS. 10A and 10B or FIG. 10C; while the bond 104 in FIG. 11C is one in which the punching, lancing or piercing is performed by a non-circular sectioned tool set, for example, rectangular.

As illustrated above, the male and female jaw sets 13, 14 are shown as extending rectilinearly from front to rear, however, it is also contemplated that the jaws 15, 16 and 17, 18 may be offset 90° to the direction of operation of the actuator cylinder 30 and cam and roller provisions associated therewith; and this is also true of the alternative embodiment now to be described.

Referring to FIGS. 12 and 13 of the drawings, the modified embodiment 110 of the bonding device shown therein is one in which its jaw means, to be described in detail, are operated manually or under mechanical or fluid pressure power by a longitudinally movable actuator. In general the device 110 comprises a housing structure 112, adapted, as in the first embodiment of FIGS. 1–7, to be manually portable or to have a suitably fixed mount, not shown. This housing structure includes a pair of suitably rugged, parallel basic side plates 113 and 114 (although the very schematically shown structure may of course have further refinements); a pair of male and female, outer and inner jaw sets, respectively designated in general by the reference numerals 116 and 117, of which the male pair or set includes an outer jaw 118 and an inner jaw 119, and the female set 117 includes an outer jaw 120 and an inner jaw 121, these male and female outer and inner jaws being pivotally mounted between housing side plates 113, 114 by transverse pivot pins 123 and 124, respectively (and being constituted and outlined in the manner to be described); and a longitudinally movable actuator 126.

As schematically shown in FIGS. 12–15 of the drawings, the housing side plates 113, 114 are appropriately braced rigidly in parallel, laterally spaced relation to one another, as by a transverse forward block 128 extending between and secured to the walls 113, 114, and a pair of generally similar, rear blocks or struts 129, which may serve the additional function of to some extent guiding the actuator 126 in its longitudinal reciprocation, as will be described.

Actuator 126 is illustrated as being in the form of a pair of parallel flat bars 131 each integrally formed at its inner end with a T-head 132. The bars 131 are in exact lateral register with one another, they and their heads 132 being disposed on opposite sides of the jaw sets 116, 117 within the housing side walls 113, 114; and for the further purpose of guiding actuator 126 in its longitudinal reciprocation, the walls 113 may be provided with an internal recess or recesses at 134 (FIG. 13) to accommodate the enlarged T-heads 132 of the respective actuator bars 131. FIG. 12 shows but a single recess 134 of rectangular shape in each plate 113, 114 along with the ends of the actuator head 132 are slidably guided throughout the full longitudinal stroke of actuator 126. However, other appropriate means may be provided for the guiding function, if felt necessary, and are therefore contemplated by the invention.

Actuator 126 is completed by one or more operating rollers 136 journaled between actuator bars 131 by a transverse pivot pin 137 carried by one arm of the actuator T-heads 132; and by a similar roll or rollers 138 similarly journaled between the corresponding other actuator T-arm by a transverse pivot pin 139. Whether there are more than one of the respective rollers 136, 138, their function is to respectivey travel in certain specially shaped camming slots of the jaws 118, 119 of male jaw set 116, and of the jaws 120, 121 of female jaw set 117, to effect the independent relative swing of these sets and jaws relative to one another, as contemplated by the invention. The nature of the jaw cam slots referred to, as formed wholly within the jaw contours in the embodiment, is later described in connection with FIGS. 16A, 16B and 17A, 17B of the drawings.

As actually illustrated herein, the outer male jaw 118 of device 116 is shown as comprising, in addition to a jaw 140 proper, an elongated and strap-like cam extension 141, in which a cam slot (to be described) is formed; and this extension is shown as being parallelled on its opposite sides by a pair of generally similar extensions 142 integral with the inner male jaw 119, the extensions 141, 142 being in immediate side-by-side relation to one another.

Similarly, in regard to the female jaw set 117 (FIG. 12), its outer jaw 120 is depicted as having an integral, rearwardly elongated bar extension 145 disposed in side-by-side relation between integral bar extensions 146 of the inner female jaw 121. Again, as in the earlier embodiment, all of the jaws 118, 119, 120 and 121 may have one-piece rearward cam means rather than the dual extension means shown.

Now considering FIGS. 16A, 16B and 17A, 17B in conjunction with FIGS. 12, 14 and 15, the outer male jaw 118 (FIG. 16A), as pivotally mounted by pin 123 directly to the rear of the head 140 of the jaw, has its extension 141 formed to provide an elongated, rearwardly extending, specially shaped cam slot 148, including generally parallel walls extending between generally semi-circular forward and rear ends 149, 150, respectively. One of these walls includes a mildly angular-shaped inward projection or node 151 into which adjoining wall portions merge; and an opposed mildly rounded bay or recess 152 in the other wall.

As for the inner male jaw 119 (FIG. 16B), as also pivoted by pin 123, its slot (or slots) 154 is also rearwardly elongated and parallel-walled, being defined by rectilinear wall portions 155, 156 which extend from a forward slot end 157, then merge through mildly angled, parallel wall portions 158, 159, into the opposite rounded cam wall end 160. The sides of the actuator roller 136 (FIG. 13), or roller portions in the event the latter is three part, are received in the extension slot 148 of outer male jaw 118 for the cam operation of the latter; while an intermediate portion similarly engages in the slot 154 of inner male jaw 119 to produce its timed independent pivotal motion relative to jaw 118.

Reference now being had to FIG. 17A, the outer female jaw 120, as pivoted within housing structure 112 by pin 124, has its cam slot 166 extending between generally semi-circular ends 167, 168 from mildly arcuate, parallel wall portions 169, 170 inclining outwardly of the jaw extension. Portion 169 terminates in a small inner node 171, from which an outwardly curved wall portion 172 and a flat 173 go to the wall end 168; while the curve 170 terminates at a node 174, whence slot 166 angles rearwardly at 175 to wall end 168.

The inner jaw 121 of the female jaw set 117 (FIG. 17B) has formed therein a cam slot 177 whose shape is generally similar to that of the slot 154 of inner male jaw 119, but in mirror image, in that its parallel rectilinear wall portions 178, 179 and mildly inclined portions 180, 181 merge into opposite rounded end portions 182, 183.

The roller or rollers 138 of actuator 126 travel the respective slots 166, 177 of female jaws 120, 121 in producing the timed independent motion of these jaws relative to one another in the operation of device 110.

Reference being had to FIGS. 13 and 15, the outer male jaw 118 is shown as comprising a generally cylindrical head 185 which is provided with a threaded transverse bore 187 from the exterior thereof, and a quasi-spherical seat 188 opens from this bore through the opposite side of head 185. Bore 187 threadedly receives a retainer plug 189 having a semi-spherical seat 190, which coacts with the seat 188 in providing a socket receiving the approximately spherical end 191 of a male pierce or punch tool, generally designated 192.

The inner male jaw 119 has a head 194 provided with a reduced cylindrical boss 195, through which a cylindrical guide bore 196 extends; and bore 196 slidably receives the punch tool 192 (FIG. 15).

The outer female jaw 120 has a generally cylindrical head 198, which, like outer male jaw head 140, has a threaded bore 199 receiving a tubular retainer plug 200. This coacts with the remainder of head 198 in providing a quasi-spherical socket 201 receiving the spherical end of a hollow female die and clinch tool 202 for coaction with male punch 192.

Inner female jaw 121 has a head 204 provided with a cylindrical bore 205 which slidably receives die member 202; and punch 192 and die 202 are adapted to have telescoping mated engagement with one another in the punching of the sheet or sheets, as best illustrated in FIG. 15 of the drawings.

In the operation of the device as described, reference being had to FIGS. 12, 14 and 15, again in conjunction with FIGS. 8A–9D, at commencement the actuator 126 is fully retracted to the right, with its operating roller 136 adjacent the ends 150 and 164 of the respective extension slots 148, 154 of the outer and inner male jaws 118, 119, respectively; and with its roller 138 similarly positioned in relation to the respective slots 166, 167 of female jaws 120, 121.

Upon movement of actuator 126 to the left, as the male jaw operating roller 136 rides down male jaw slot 148 to the node 151 of the latter, outer male jaw 118 is swung counterclockwise about the pivot 123 in a punching stroke of tool 192; and the travel of roller 136 along the inclines 158, 159 of inner male jaw slot 154 similarly swings inner jaw 119 about the same pivot 123, but to a somewhat lesser degree, into sheet clamping position.

Correspondingly, as the female jaw actuator roller 138 traverses the slot 166 of outer female jaw 120 to the left, riding up onto the slot node 174, the jaw 120 is swung clockwise about its pivot on pin 124; and the female tool or die 202 in jaw 120 coacts with punch 192 in piercing the sheets S, S' (FIG. 9A). Coincidentally, the roller 138 travels along the inclines 180, 181 of slot 177, thus also swinging inner female jaw 121 clockwise about pivot 124, but to a somewhat lesser degree than female jaw 120 sufficient to bring inner jaws 119 and 120 into sheet clamping engagement. The positions of the parts are shown in FIG. 14 and FIG. 8A.

However, as the female jaw actuator roller 138 passes over the node 174 of the outer female jaw slot 166 (the other roller 136 still riding up on the node 151 of outer male jaw slot 148), and as roller 138 commences to travel up the slot incline 170, the swing of outer female jaw 120 is directionally reversed to counterclockwise, the same as that of outer male jaw 118.

Thus, jaw 118 continues past its punching position, its punch 192 stamping out the waste slug material s (left of FIG. 8A), to the position shown at the center of that figure. After punching, the die 202 follows with it; and the sheets S, S' are extruded 90° downwardly as shown. The sheets remain under clamping pressure outwardly of the extruded zone between inner jaws 119, 121.

As the male jaw operating roller 136 passes the node 151 of slot 148, commencing to travel to the left up the opposite arcuate slot bay 152, the swing of outer male jaw 118 and its tool 192 is reversed to clockwise. Also, as the actuating roller 138 of the female jaw 120 passes beneath the node 171 of outer jaw cam slot 166, and commences to travel up the incline 170 of that slot, the swing of the jaw 121 is also reversed to clockwise. Hence, as rollers 136, 138 complete their travel to the left, the female tool 192 (male punch 192 traveling with it) goes to the final position of FIG. 15 and FIG. 8C, upon which the previously extruded edges of sheets S, S' are both crimped another 90° outwardly to complete the bonding of the sheets to one another. As before, the jaw 121 in its lowered, dotted line position (center of FIG. 8) permits the crimping to commence as die 202 starts upwardly; and the space between the top of jaw 121 (or jaw 18), shown in dotted line, accommodates the edges of the workpiece sheets as they are rollingly deformed outwardly and crimped. This permits a greater overlap onto the body of sheet S' and a stronger bond.

As the motion of actuator 126 reverses to the right, the punch and die tools 192, 202, respectively return to the original spread condition of FIG. 12, and the respective inner male and female jaws 119, 121 similarly spread, but to a lesser degree, to release the bonded sheets.

FIG. 18 of the drawings schematically illustrates a toggle type of force-multiplying, mechanical advantage linkage which may be incorporated in either of the embodiments described in detail above. Thus, assuming roller sets 208, 209, corresponding respectively to the previously described sets 36, 38 and 72, 73, these sets may be pivotally connected by links 210, 211, respectively to an appropriate actuator, generally designated 212. The roller sets are guided in upper and lower grooves 213, 214, respectively, of which the former has an upward rise intermediate its length at 215 and the latter terminates in a downwardly and forwardly inclined recess or notch 216. It will be appreciated that, when the actuator 212 bottoms out at the right-hand end, as indicated in dot-dash line, against the ends of the grooves 213, 214, the links 210, 211 will be straightened out in the manner of a toggle, thus to exert substantially increased clinching force on the inner male and female jaws 16, 18, and the die 60 of the latter. It is believed that those skilled in the art will readily appreciate the manner in which the cam formations of the embodiments of FIGS. 1–7, on the one hand, and FIGS. 12–17B, on the other, may be modified to incorporate the principle of operation schematically shown in FIG. 18.

FIG. 19 of the drawings is intended in only the most schematic way to show an embodiment 215 of the bonding device which has a rotative cam drive of its male and female jaw sets. Thus, as mounted within the housing structure of which one side plate is shown at 216, the device 215 may comprise a pair of specially formed actuator cam plates 217, 218 fixed to and rotatable by a transverse shaft 219 journaled by the housing structure. This shaft may be manually or motor driven, as indicated above. A further specially and differently shaped cam plate 221 is rotated by the same shaft, being disposed between cams 217, 218 in side-by-side relation to one another.

Schematically shown outer and inner male and outer and inner female jaw sets 223, 224, respectively, are operated independently in predeterminedly timed relationship by the cam 221 and the cam pair 217, 218, respectively. Thus, the male jaw set 223 has an outer male jaw arm 225 which follows cam 221, and a pair of inner male jaw arms 226, which ride the cams 217, 218, the jaw members 225, 226 being journaled within the housing structure by a pivot pin 228. Similarly, the female jaw set includes an outer jaw arm 230 riding the cam 221 and a pair of inner female jaw arms 231 which follow the respective cams 217, 218, the arms 230, 231 being pivoted on one axis, like male arms 225, 226, by a pivot pin 232. Specific structural details of the provisions just described have been eliminated for simplicity and clarity.

Another modified form of the invention, which also utilizes rotary cam means as a source of power for the jaw sets, is schematically illustrated in FIG. 20 of the drawings. This embodiment differs from those previously described in the fact that its male and female jaw sets 234, 235, respectively, have a strictly rectilinear reciprocating action along a common upright axis, as distinguished from swinging motion relative to one another and the sheets being bonded.

The device, generally designated by the reference-numeral 236, has its operating components mounted upon a suitably massive base support 237, which affords bearing means for a pair of vertically spaced, upper and lower shafts 238, 239, respectively. A pair of generally ovoidal cams 240, 241 are fixedly mounted coaxially on the upper shaft 238, together with a driven gear 242, which gear is rotated by a suitably powered meshing pinion 243. The lower shaft 239 similarly carries a pair of cams 245, 246 fixed thereon, along with a driven gear 247 in mesh with gear 242. Thus the respective cam sets, from which a drive of the jaw sets 234, 235 is had, operate rotatively in accurately synchronized speed relation.

The male jaw set 234 includes an outer tubular jaw member 248, appropriately guided in a fixed frame sleeve 249, and an inner male punch member 250 slidably guided in a tubular plug 251 threaded into outer member 248.

The latter has a pivotal top connection at 253 to an arm 254 of a power-multiplying toggle, the other arm 255 of which is pivoted to frame 237 at 256. A common pivot of the arms 254, 255 at 257 also pivots the left-hand end of an elongated thrust link 258; and the opposite, right-hand end of link 258 carries a follower roller 259 which rides the surface of the cam 240. Link 258 has an elongated slot 260 receiving a fixed pin 261 on frame 237, thus affording a guide for the to-and-fro motion of link 258 in straightening and breaking the toggle arms 254, 255. Suitable spring or equivalent means (not shown) may be employed to maintain running engagement of link follower roll 259 with the surface of cam 240.

The inner punch member 250 of male jaw set 234 is carried on the lower end of a stem 263, which at its upper end is pivotally connected by a pin 264 to a short upright thrust link 265; and this link is in turn pivotally connected at 266 to the left-hand end of a rocker lever arm 267. Arm 267 has a fixed horizontal pivot at 268 to the base frame 237, and its right-hand end is equipped with a follower roller 269 which rides the second rotary cam 241. Thus, powered rotation of the cam set 240, 241 produces vertical rectilinear reciprocation of the male jaws 248, 250 in a limited relationship corresponding to that of the several other male jaw sets described above, both in relation to one another and to the female jaw set 235. The male jaw 248 fixedly carries a sheet clamp and clinching head 270, whose positions in the operation of jaw set 234 are indicated in solid and dotted line, the corresponding position of the lever arm 267 being also shown in dotted line in FIG. 20. It is spring or otherwise urged against cam 240.

The female jaw set comprises an outer jaw member 272 and an inner jaw or die member 273 telescoped therein. Outer member 272 has a laterally projecting drive pin 274 received in an elongated slot 275 of an elongated operating arm 276 which is pivotally connected to frame 237 at 277; and arm 276 carries a follower roller 278 which rides the peripheral surface of cam 246.

The same pivot 277 mounts a second arm 280 of L-shaped outline, provided at its end with a follower roller 281 which rides the second cam 245 of the female jaw operating cam pair. The left-hand end of arm 280 extends through an appropriate side opening in outer female jaw member 272, engaging from beneath the bottom of inner female jaw or die member 273.

Thus, the male and female jam sets 234, 235 are power-operated in the same differentially timed and sequenced succession which has been described in detail above in connection with earlier embodiments. The thrust of the jaw members is truly rectilinear along a common axis, with a final magnification of the upsetting and clinching thrust produced through the toggle arms 254, 255. As in the case of the male set, the arms 276, 280 may be held in engagement with the respective cams 246, 245 by suitable spring or equivalent means.

It is seen in FIG. 20 that the use of a strictly rectilinear relative jaw motion permits a considerable vertical spread of throat between jaw sets 234, 235, plus a true vertical thrust component.

Several embodiments of the invention have been illustrated and described, sufficient to indicate the adaptability of the bonder of the invention for either portable or fixed mounting, manually or power operation, whether reciprocative or rotative in regard to the actuator and the like.

Other embodiments of more or less like character will suggest themselves to those skilled in the art. Thus, as a relatively simple refinement, the male and female jaw sets may be equipped with multiple punch and die components to perform simultaneous gang bonding operations upon the sheets S, S'. Easily operable means to adjust the degree or amplitude of thrust of the operating cam means may be incorporated; and all such refinements are regarded as being within the intent of the invention.

The invention affords a simple and inexpensive mechanism and method for, in a single operation, strongly bonding sheets without resort to the use of spot welding or separate rivets or grommets. It is a substitute for other conventional bonding procedures, such as bolting and the like, which may be either unneeded or undesirable for one reason or another.

What I claim as my invention is:

1. A device to bond plural sheets without resort to welding, separate rivet-like or other means, comprising pairs of male and female jaw members, each pair including an inner member engageable with a sheet from one direction to clamp the sheets together, and an outer penetrating and extruding member or outer upsetting member engageable with the sheet from the same direction as the inner member, said inner members having means guiding said respective outer members for motion relative thereto in a progressive sheet penetrating, extruding and upsetting operation, and means to actuate said pay member pairs in said operation relatively toward and away from the sheets to be bonded from opposite sides of the latter, said actuating means including means to shift at least one of said inner jaw members out of clamping engagement with a sheet prior to the upsetting portion of said operation to afford space between the sheets and an inner member to laterally accommodate the upset material.

2. A bonding device in accordance with claim 1, in which said actuating means operates translationally.

3. A bonding means in accordance with claim 1, in which said actuating device operates rotatively.

4. A bonding means in accordance with claim 1, in which said actuating device operates translationally and has means to operate the same manually.

5. A bonding means in accordance with claim 1, in which said actuating device operates translationally and has means to operate the same under automatic power.

6. A device to bond plural sheets without resort to welding, separate rivet-like or other means, comprising pairs of male and female jaw members, each pair including an inner member engageable with a sheet from one direction, and an outer penetrating and extruding member or outer upsetting member engageable with the sheet from the same direction as the inner member, said inner members having means guiding said respective outer member for motion relative thereto in a progressive sheet penetrating, extruding and upsetting operation, means pivotally mounting said jaw member pairs to swing toward and away from opposite sides of sheets to be bonded about spaced parallel axes each common to the members of the respective pairs, and means to actuate said pairs for said swinging motion in an independently timed relation of the pairs to one another and of the members of each pair to one another.

7. A bonding device in accordance with claim 1, in which said actuating means is operated automatically by fluid pressure means.

8. A bonding device in accordance with claim 1, in which said actuating means is operated automatically by fluid pressure means, said actuating means including cams connected to said jaw members, and cam follower means operatively connected to said fluid pressure means and engageable with said cams to produce said motions or the jaw members.

9. A device in accordance with claim 1, in which said actuating means includes means to increase the force exerted by said jaw members upon said sheets in the upsetting phase of said operation.

10. A device in accordance with claim 1, in which said actuating means includes means to increase the force exerted by said jaw members upon said sheets in the upsetting phase of said operation, said force increasing means including a toggle which is straightened by said actuating means in said upsetting phase.

11. A bonding device in accordance with claim 1, in which said jaw member pairs are actuated in said sheet penetrating, extruding and upsetting operation in independent motions of the respective outer and inner jaw members, as well as of said jaw member pairs, relative to one another.

12. A bonding device in accordance with claim 1, in which certain of the male and female jaw members of said pairs have means pivotally mounting the same to swing toward and away relative to opposite sides of the sheets about spaced parallel axes, one of which axes is common to the jaw members of one of the pairs.

13. A bonding device in accordance with claim 1, in which said actuating device comprises cam and cam follower means controlling said inner and outer jaw members in said progressive sheet penetrating, extruding and upsetting operation.

14. A bonding device in accordance with claim 13, in which said cam means comprises elongated and irregularly shaped slots in certain of said jaw members, said follower means including follower elements guided in said slots in said operation.

15. A device to bond plural sheets without resort to welding, separate rivet-like or other means, comprising pairs of male and female jaw members, each pair including an inner member engageable with a sheet from one direction in an operation to clamp the sheets together, and an outer penetrating and extruding member or outer upsetting member engageable with a clamped sheet from the same direction as the inner member in a penetrating and extruding or an upsetting operation, said inner members having means guiding said respective outer members for coaxial motion relative thereto, and means to actuate said jaw member pairs in said operation relatively toward and away from the sheets to be bonded from opposite sides of the latter, said actuating means comprising means common to at least one pair of said male and female jaw members to positively move the same relative to one another in said clamping operation and said penetrating and extruding or upsetting operation.

16. The device of claim 15, in which said means common to said pair comprises cam formations carried by said respective jaw members thereof, and a single actuated follower engageable with said formations to effect said relative movement of the jaw members of the pair.

17. The device of claim 15, in which each of said jaw member pairs includes one of said common actuating means.

18. The device of claim 16, in which each of said jaw member pairs has said cam formations and a follower coacting therewith.

19. The device of claim 15, in which said pair of male and female jaw members actuated by said common means are resiliently biased away from one another.

20. The device of claim 16, in which said pair of male and female jaw members actuated by said common means are resiliently biased from one another.

21. A device to bond plural sheets without resort to welding, separate rivet-like or other means, comprising pairs of male and female jaw members, each pair including an inner member engageable with a sheet from one direction in an operation to clamp the sheets together, and an outer penetrating and extruding member or outer upsetting member engageable with a clamped sheet from the same direction as the inner member in a penetrating and extruding or in an upsetting operation, said inner members having means guiding said respective outer members for coaxial motion relative thereto, and means to actuate said jaw member pairs in said operation relatively toward and away from the sheets to be bonded from opposite sides of the latter, said actuating means comprising means for moving the members of said pairs relative to one another in successive actions in which said inner jaw members clamp the sheets, said outer male member penetrates at least one of the sheets and, in engagement with the outer female member, extrudes the penetrated sheet and, in a reverse action, said outer female member upsets the sheet extrusion, said outer male and female members separating from engagement and said outer female member again reversing action following the upsetting action.

22. A device to bond plural sheets without resort to welding, separate rivet-like or other means, comprising pairs of male and female jaw members, each pair including an inner member engageable with a sheet from one direction in an operation to clamp the sheets together, and an outer penetrating and extruding member or outer upsetting member engageable with a clamped sheet from the same direction as the inner member in a penetrating and extruding or an upsetting operation, said inner members having means guiding said respective outer members for coaxial motion relative thereto, and means to actuate said jaw member pairs in said operation relatively toward and away from the sheets to be bonded from opposite sides of the latter, said actuating means comprising cam means having a part common to at least one pair of said male and female jaw members for positively moving the members of said pairs relative to one another in successive actions in which said inner jaw members clamp the sheets, said outer male member penetrates at least one of the sheets and, in mating engagement with the outer female member, extrudes the penetrated sheet and, in a reverse action, said outer female member upsets the sheet extrusion, said outer male and female members separating from mating engagement and said outer female member again reversing action following the upsetting action.

23. The device of claim 22, in which said cam means comprises cam formations on the respective male and female jaw members of said one pair, and a follower movably engaging said cam formations in common to effect said relative movement and actions of the jaw members.

References Cited

UNITED STATES PATENTS

| 1,825,017 | 9/1931 | Singer | 72—452 |
| 2,140,658 | 12/1938 | Van Sittert | 72—452 |
| 2,333,966 | 11/1943 | Weiss | 113—116 |
| 2,467,969 | 4/1949 | Debrot | 113—116 |
| 2,865,451 | 12/1958 | Ihrig | 113—116 |
| 3,094,767 | 6/1963 | Grimm | 72—452 |

FOREIGN PATENTS

| 702,443 | 1/1954 | Great Britain. |
| 745,380 | 2/1956 | Great Britain. |

CHARLES W. LANHAM, *Primary Examiner.*

E. M. COMBS, *Assistant Examiner.*

U.S. Cl. X.R.

72—335, 354, 389, 452